United States Patent
Gross et al.

(10) Patent No.: US 10,209,538 B2
(45) Date of Patent: Feb. 19, 2019

(54) WINDOW HAVING ACTIVE TRANSPARENCY CONTROL

(71) Applicant: Elbit Systems Ltd., Haifa (IL)

(72) Inventors: Noam Gross, Kiryat Ono (IL); Ariela Donval, Rosh Haayin (IL); Doron Nevo, Ra'anana (IL); Moshe Oron, Rehovot (IL)

(73) Assignee: Elbit Systems Ltd., Haifa (IL)

( * ) Notice: Subject to any disclaimer, the term of this patent is extended or adjusted under 35 U.S.C. 154(b) by 0 days.

(21) Appl. No.: 15/943,251

(22) Filed: Apr. 2, 2018

(65) Prior Publication Data

US 2018/0292683 A1  Oct. 11, 2018

Related U.S. Application Data (60) Division of application No. 15/001,581, filed on Jan. 20, 2016, now Pat. No. 9,933,638, which is a continuation of application No. 14/364,339, filed as application No. PCT/IB2012/057400 on Dec. 17, 2012, now abandoned.

(60) Provisional application No. 61/581,509, filed on Dec. 29, 2011, provisional application No. 61/654,133, filed on Jun. 1, 2012.

(51) Int. Cl.
| | |
|---|---|
| *G02F 1/03* | (2006.01) |
| *G02F 1/01* | (2006.01) |
| *G02B 5/23* | (2006.01) |
| *E06B 7/28* | (2006.01) |
| *E06B 9/24* | (2006.01) |

(52) U.S. Cl.
CPC ............ *G02F 1/0126* (2013.01); *E06B 7/28* (2013.01); *E06B 9/24* (2013.01); *G02B 5/23* (2013.01); *G02F 1/0121* (2013.01); *E06B 2009/2464* (2013.01)

(58) Field of Classification Search
CPC ...................................................... G02F 1/0126
USPC ......................................................... 359/244
See application file for complete search history.

(56) References Cited

U.S. PATENT DOCUMENTS

| | | | |
|---|---|---|---|
| 9,933,638 B2 * | 4/2018 | Gross | ........................ E06B 9/24 |
| 2005/0196626 A1 * | 9/2005 | Knox | ........................ C09K 9/02 |
| | | | 428/447 |
| 2011/0133672 A1 * | 6/2011 | Tsang | ....................... F21S 10/02 |
| | | | 315/294 |

* cited by examiner

*Primary Examiner* — James Jones
(74) *Attorney, Agent, or Firm* — Pearl Cohen Zedek Latzer Baratz LLP

(57) ABSTRACT

An active, transparency-controlled window comprises at least one layer of a material that is transparent to at least selected wavelengths of light; at least one layer of photochromic material having a transparency, to the at least selected wavelengths of light, that can be controllably altered by an activating light; and a controllable source of light that activates the photochromic material to controllably alter the transparency of the photochromic material to the at least selected wavelengths of light. The material that is transparent to at least selected wavelengths of light may be a material selected from the group consisting of glass and plastic.

17 Claims, 7 Drawing Sheets

WINDOW HAVING ACTIVE TRANSPARENCY CONTROL

RELATED APPLICATIONS

This application is a divisional of U.S. patent application Ser. No. 15/001,581, filed Jan. 20, 2016 (now allowed) which is a continuation of U.S. patent application Ser. No. 14/364,339, filed Jun. 11, 2014, which is a U.S. National Stage of and claims priority to International Application No. PCT/IB2012/57400, filed Dec. 17, 2012, which claims priority related to U.S. Provisional Application No. 61/581,509, filed Dec. 29, 2011, and U.S. Provisional Application No. 61/654,133, filed Jun. 1, 2012, each of which is hereby incorporated by reference herein in its entirety.

FIELD OF THE INVENTION

The present invention relates to active transparency control of a window, and more particularly, to the control of transparency using controlled light activation of photochromic materials embedded in the window material and to a method for controlling the light activation of photochromic materials embedded in window materials. The photochromic materials in the window change the light transmission of the transparent window when exposed to controlled activating light.

BACKGROUND OF THE INVENTION

Window panes with adjustable transparency are a known product. For example, see U.S. Pat. Nos. 6,674,419, 6,597,412, 6,522,446, 6,606,185, 6,301,040, EP O 608 203 B1, and Document BINE 1/02, published by the Technical Information Center Karlsruhe, Gesellschaft fur wissenschaftlich-technische Information mbH, as well as the Internet site www.smartglass.com. Window panes with an adjustable transparency can be obtained, for example, from FLABEG GmbH & Co. KG, Siemensstrasse 3, 90766 Furth, Germany, or GESIMAT GmbH, Gesellschaft fur intelligente Materialien and Technologien, Innovationspark Wuhlheide, Kopenicker Strasse 325, 12555 Berlin, Germany.

Another example is the electrochromic automatic-dimming rear view mirror of Gentex, http://www.gentex.com/, which detects and eliminates dangerous rearview mirror glare.

All the above use either electro-chromic materials or liquid crystals serving as the active material, and their activation is carried out by electric voltage, applied across the active material through transparent electrodes.

There is a constant need for simpler active transparency control of windows, mainly for display showcases, vehicle front windows, sun protectors and regulated sun glasses.

SUMMARY OF THE INVENTION

It is therefore a broad object of the present invention to provide active transparency control of a window, and more particularly, to control the transparency by light activation of photochromic materials embedded in the window material. The photochromic materials in the window change the light transmission of the transparent window, e.g., in the visible and/or infra-red part of the spectrum, when exposed to controlled activating light. That is, the light activation of the photochromic material is controlled to change the light transmission of the transparent window. This active transparency control of the window offers the following advantages and properties:

1. Since the effect of the photochromic material is controlled by illuminating the window with a controllable beam of activating light, there is no need for electrical electrodes or transparent conducting coatings on the window pane.
2. There is no limitation on the geometrical shape of the window.
3. A large change of transparency can be achieved by using photochromic materials rather than electro-chromic materials.
4. The activating light can impinge on the window through light guides and fiber optics, enabling low-volume, low-weight windows.
5. The amount of activating light can be precisely controlled and adjusted in small increments to allow for the selection of intermediate states of light transmittance.

Some uses for the active transparency control of a window are in display showcases, vehicle front windows, sun protectors and regulated sunglasses or sun shields.

In one embodiment, the active, transparency-controlled window comprises at least one layer of a material that is transparent to at least selected wavelengths of light; at least one layer of photochromic material having a transparency, to the at least selected wavelengths of light, that can be controllably altered by an activating light; and a controllable source of light that activates the photochromic material to controllably alter the transparency of the photochromic material to the at least selected wavelengths of light. The material that is transparent to at least selected wavelengths of light may be a material selected from the group consisting of glass and plastic.

In one implementation, the controllable light source directs light into the photochromic material, and alters the transparency of the window by altering the transparency of the photochromic material by adjusting the strength of the light directed into the photochromic material. The photochromic material is activatable by light within a predetermined range of wavelengths, and the controllable light source produces light having a wavelength within that predetermined range. The predetermined range of wavelengths may be in the ultraviolet region of the spectrum or in the 400 to 500 nanometer wavelength range. The light source may be controlled to produce a preselected opacity level from the combined activation of the photochromic material by (1) ambient light and (2) light from the controllable light source. The controllable light source may direct light into the photochromic material through at least one of the narrow edges of the window.

In one embodiment, the photochromic material is sandwiched between two layers of glass or plastic that are coated on their opposed surfaces to provide a waveguide for the activating light. This protects an observer's eyes from the activating light. The two layers of glass or plastic may have indices of refraction that are (1) substantially the same as or lower than the index of refraction of the photochromic material, and (2) higher than the index of refraction of the ambient environment of the window, to provide a waveguide for the activating light and efficient penetration of the activating light into the photochromic material.

In one embodiment, the photochromic material is sandwiched between two layers of glass or plastic where one glass or plastic is coated to provide a blocking surface for the activating light. The activating light and the regular light come from the same source, e.g. solar light, and the response of the device depends on the direction of the incoming light. In case the activating light engages the blocking surface before impinging on the photochromic material, the window will stay transparent. In case the activating light engages the photochromic material before impinging on the blocking surface, the window will turn dark and will transmit only a small amount of light. This window acts like a light diode for the impinging light that contains the activating light; fully transparent for light coming from one direction and nearly opaque for light coming from the opposite direction.

The controllable light source may include at least one light emitting diode or diode laser, at least one lens or lens array to provide the light source with a prescribed divergence angle, and/or at least one single-optical-fiber or multiple-optical-fiber device.

The photochromic material may be coated or glued to a glass or plastic layer that serves as waveguide for the activating light. The glass or plastic layer may be tapered to provide substantially even illumination of the layer of photochromic material. The amount of the photochromic material may be graded to provide a concentration that increases with the distance from the light source, to provide a substantially uniform reduction of impinging light across the window. The photochromic material may include multiple layers having different colors and separated by glass or plastic layers that serve as waveguides to filter out of part of the spectrum.

BRIEF DESCRIPTION OF THE DRAWINGS

The invention will be better understood from the following description of preferred embodiments together with reference to the accompanying drawings, in which.

In the drawings.

DETAILED DESCRIPTION OF PREFERRED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
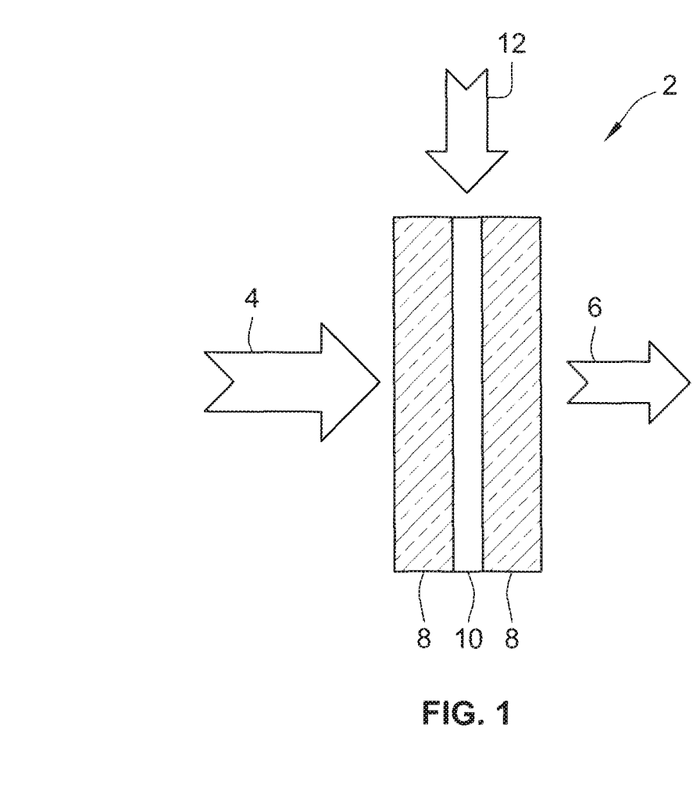
FIG. 1 is a schematic view of an active transparency controlled window using a photochromic material layer sandwiched between two glass layers.

FIG. 1 is a schematic view of an active transparency controlled window 2 using a photochromic material layer 10 sandwiched between two layers 8 of a material, e.g., glass or plastic, that is transparent to at least selected wavelengths of light. The photochromic material layer 10 is activated by a controllable light source 12, and the optical transparency of the window 2 is controlled by the amount of active material in the layer 10 and the strength of the activating light 12. Regular, visible or infrared light 4 impinging on the window 2 is reduced in intensity while transmitted through the window 2 and exits as reduced light energy 6, where part of the impinging light 4 is absorbed in the activated photochromic layer 10. The transparency of the photochromic layer 10 is controllably altered by the activating light, which permits use of the controllable light source 12 to alter the transparency of the window by adjusting the strength of the light directed into the photochromic material. The activating light 12 may be in the ultra violet region of the spectrum or in the 400 to 500 nanometer wavelength region, to match the activation wavelength of photochromic material layer 10.

Figure 2:
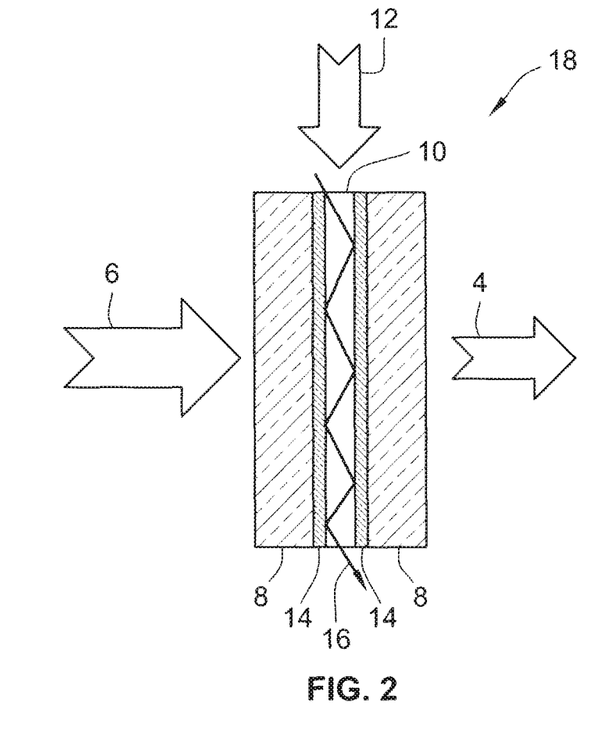
FIG. 2 is a diagram of an active transparency controlled window using a photochromic material layer sandwiched between two glass layers, where dedicated coatings provide a waveguide for the light.

FIG. 2 is a schematic view of an active transparency controlled window 18 using a photochromic material layer 10 sandwiched between two layers 8 of a material, e.g., glass or plastic, that is transparent to at least selected wavelengths of light, where dedicated coatings 14 provide a waveguide for the activating light 12. The coatings 14 have indices of refraction that are (1) substantially the same as or lower than the index of refraction of the photochromic material, and (2) higher than the ambient environment of said window, to provide a waveguide for the activating light and efficient penetration of the activating light the said photochromic material.

The optical transparency of the window 18 is controlled by the amount of active material in the layer 10 and the strength of the activating light 12. Regular, visible or infrared light 4 impinging on the window 18 is reduced in intensity while transmitted through window 18 and exits as reduced light energy 6, where part of the impinging light 4 is absorbed in the activated layer 10. The transparency of the photochromic layer 10 is controllably altered by the activating light, which permits use of the controllable light source 12 to alter the transparency of the window by adjusting the strength of the light directed into the photochromic material. The photochromic material is activatable by light within a predetermined range of wavelengths, and the controllable light source produces light having a wavelength within that predetermined range. The two layers 14 are transparent for light 4, but reflective for activating light 12, e.g., when impinging at small grazing angles, as shown by light beam 16. The light 12 may be in the ultra violet region of the spectrum or in the 400 to 500 nanometer wavelength region, to match the activation wavelength of photochromic material layer 10. The inclusion of material 10 between the two reflecting layers 14 for the activating light 12 serves as a shield to the eyes of a person looking through the window 18 against the possible irritation or damage by ultra violet light.

Figure 3:
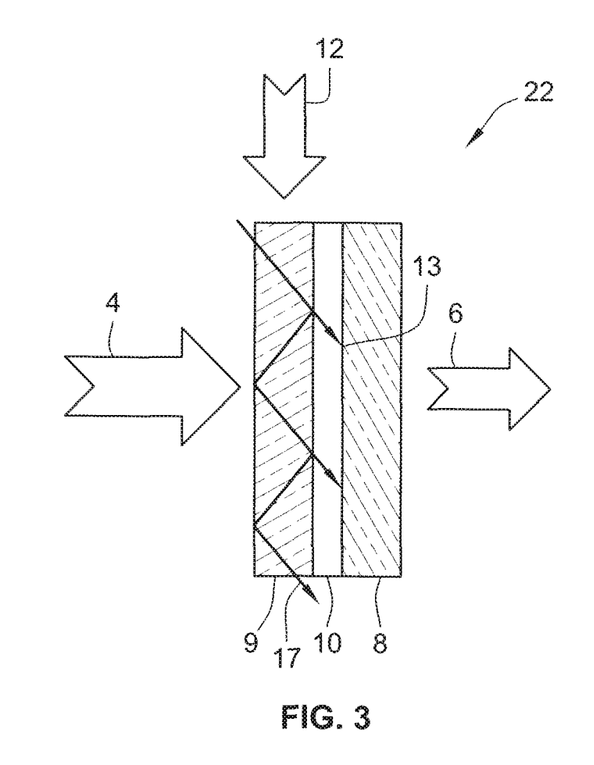
FIG. 3 is a diagram of an active transparency controlled window using a photochromic material layer sandwiched between two glass layers where one or the two glass layer serves as a waveguide for light that activates the photochromic material.

FIG. 3 is a schematic view of an active transparency controlled window 22 using a photochromic material layer 10 sandwiched between two layers 8 and 9 of a material, e.g., glass or plastic, that is transparent to at least selected wavelengths of light, where either one or both of the layers 8 and 9 serve as waveguides. In FIG. 3, the glass layer 9 provides a waveguide for the activating light 12 where part of the light 13 penetrates the photochromic material layer 10 from the layer 9. The optical transparency of the window 22 is controlled by the amount of active material in the layer 10 and the strength of the activating light 12. Regular, visible or infrared light 4 impinging on the window 22 is reduced in intensity while transmitted through the window 22 and exits as reduced light energy 6, where part of the impinging light 4 is absorbed in the activated layer 10. The transparency of the photochromic layer 10 is controllably altered by the activating light, which permits use of the controllable light source 12 to alter the transparency of the window by adjusting the strength of the light directed into the photochromic material. The photochromic material is activatable by light within a predetermined range of wavelengths, and the controllable light source produces light having a wavelength within that predetermined range. The two layers 8 and 9 are transparent for the light 4, but reflective for the activating light 12, e.g., when impinging at small grazing angles, as shown by light beam 17. The light 12 may be in the ultra violet region of the spectrum or in the 400 to 500 nanometer wavelength region, to match the activation wavelength of photochromic material layer 10.

Figure 4:
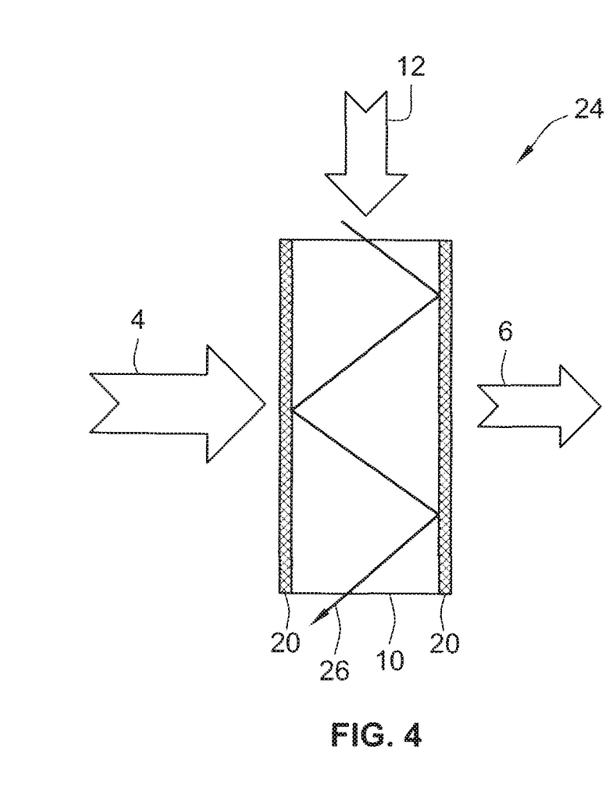
FIG. 4 is a diagram of an active transparency controlled window using a photochromic material, having two layers of reflecting coating on its two sides.

FIG. 4 is a schematic view of an active transparency controlled window 24 using a photochromic material 10 for the whole device, having two layers of reflecting coating 20 on its two faces. The combination of the photochromic material 10 and the two coatings 20 serves as a waveguide for the activating light 12. The optical transparency of the window 24 is controlled by the amount of active material in the material 10 and the strength of the activating light 12. Regular, visible or infrared light 4 impinging on the window 24 is reduced in intensity while transmitted through the window 24 and exits as reduced light energy 6, where part of the impinging light 4 is absorbed in the activated layer 10. The transparency of the photochromic layer 10 is controllably altered by the activating light, which permits use of the controllable light source 12 to alter the transparency of the window by adjusting the strength of the light directed into the photochromic material. The photochromic material is activatable by light within a predetermined range of wavelengths, and the controllable light source produces light having a wavelength within that predetermined range. The two coatings 20 are transparent for the impinging light 4, but reflective for the activating light 12, e.g., when impinging at small grazing angles, as shown by light beam 26. The light 12 may be in the ultra violet region of the spectrum or in the 400 to 500 nanometer wavelength region, to match the activation wavelength of photochromic material layer 10. Confining the material 10 between two reflecting layers 20, for the activating light 12, serves as a shield to the eyes of a person looking through window 24 against the possible irritation or damage by ultra violet light.

Figure 5A:
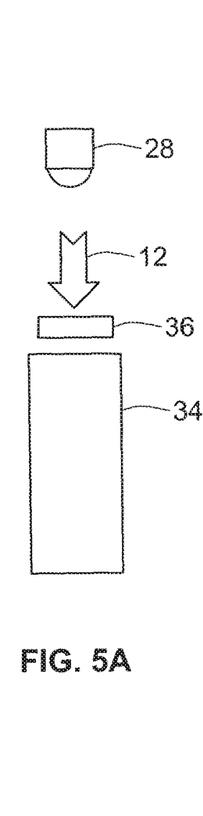
FIG. 5A is a diagram of light source arrangement for an active transparency controlled window using direct light-emitting diodes or diode lasers.
Figure 5B:
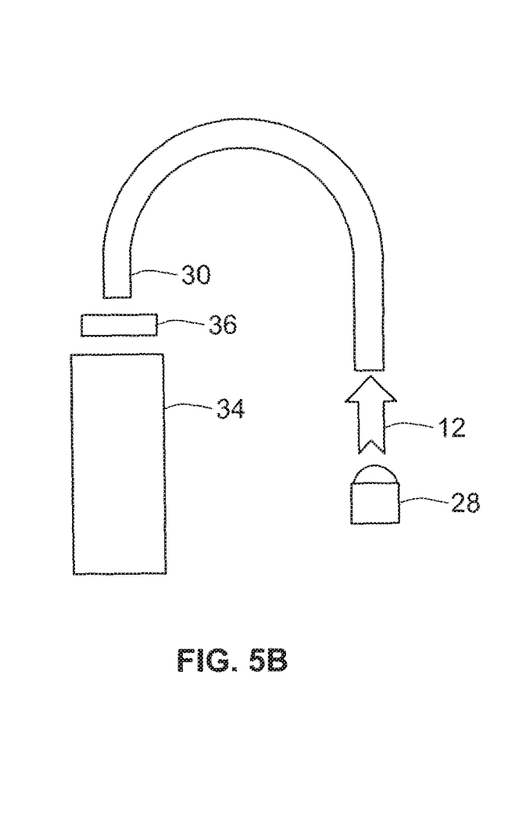
FIG. 5B is a diagram of light source arrangement for an active transparency controlled window using fiber optics delivery of light-emitting diodes or diode lasers.

FIGS. 5A and 5B are schematic views of the light source 12 arrangements for an active transparency controlled window 34: FIG. 5A using a direct light emitting diode array or diode lasers 28, and FIG. 5B using fiber optics delivery 30 of light emitting diodes or diode lasers 32. The light 12 may be in the ultra violet region of the spectrum or in the 400 to 500 nanometer wavelength region, to match the activation wavelength of the photochromic material layer in the layer 10. The light can be delivered through a lens or lens array 36 to control the collimation of light source 12.

Figure 6:
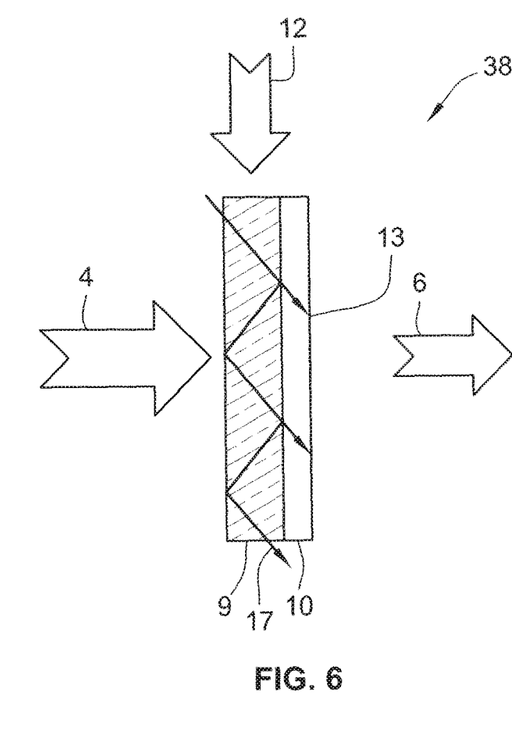
FIG. 6 is a diagram of an active transparency controlled window using a photochromic material layer coated or glued to a glass layer, where the glass layer serves as a waveguide.

FIG. 6 is a schematic view of an active transparency controlled window 38 using a photochromic material layer 10 coated or glued to a layer 9 of a material, e.g., glass or plastic, that is transparent to at least selected wavelengths of light, where the layer 9 serves as waveguide. The layer 9 provides a waveguide for the activating light 12 where part of the light 13 penetrates the photochromic material layer 10 from the layer 9. The optical transparency of window 38 is controlled by the amount of active material in the layer 10 and the strength of the activating light 12. Regular, visible or infrared light 4 impinging on the window 38 is reduced in intensity while transmitted through the window 38 and exits as reduced light energy 6, where part of the impinging light 4 is absorbed in the activated layer 10. The transparency of the photochromic layer 10 is controllably altered by the activating light, which permits use of the controllable light source 12 to alter the transparency of the window by adjusting the strength of the light directed into the photochromic material. The photochromic material is activatable by light within a predetermined range of wavelengths, and the controllable light source produces light having a wavelength within that predetermined range. The layer 9 is transparent for the light 4, but reflective for the activating light 12, e.g., when impinging at small grazing angles, as shown by light beam 17. The light 12 may be in the ultra violet region of the spectrum or in the 400 to 500 nanometer wavelength region, to match the activation wavelength of the photochromic material in the layer 10. In FIG. 6, the light 4 enters the window 38 from the side of the layer 9 and exits as light 6 from the side of the photochromic material layer 10. Light traveling in the opposite direction will experience similar attenuation.

Figure 7:
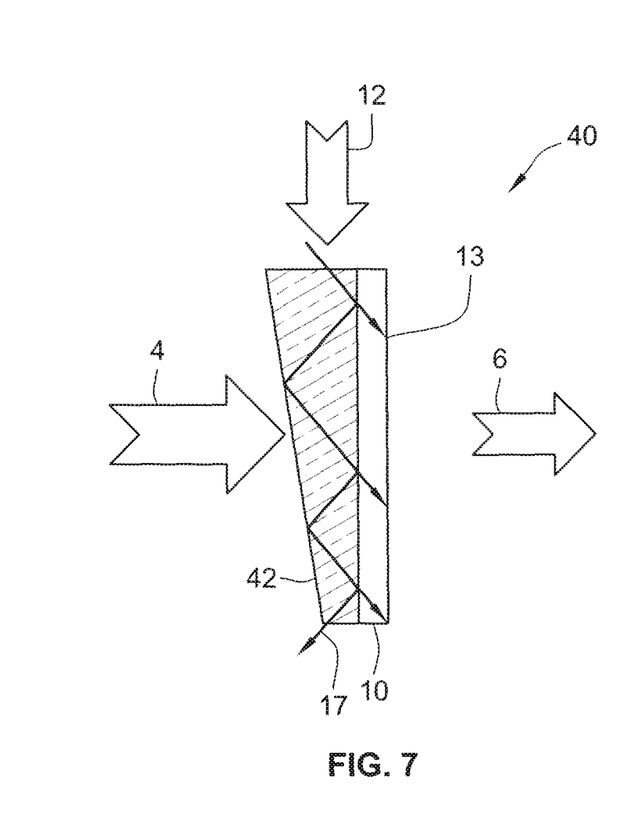
FIG. 7 is a diagram of an active transparency controlled window using a photochromic material layer coated or glued to a tapered glass layer, where the glass layer serves as waveguide, and the tapering provides even illumination of the photochromic material layer.

FIG. 7 is a schematic view of an active transparency controlled window 40 using a photochromic material layer 10 coated or glued to a tapered layer 42 of a material, e.g., glass or plastic, that is transparent to at least selected wavelengths of light. The layer 42 serves as a waveguide, where part of the light 13 penetrates the photochromic material layer 10 from the layer 42. The tapering of the layer 42 provides even illumination of the photochromic material layer 10. The optical transparency of the window 40 is controlled by the amount of active material in the layer 10 and the strength of the activating light 12. Regular, visible or infrared light 4 impinging on the window 40 is reduced in intensity while transmitted through window 40 and exits as reduced light energy 6, where part of the impinging light 4 is absorbed in the activated layer 10. The transparency of the photochromic layer 10 is controllably altered by the activating light, which permits use of the controllable light source 12 to alter the transparency of the window by adjusting the strength of the light directed into the photochromic material. The photochromic material is activatable by light within a predetermined range of wavelengths, and the controllable light source produces light having a wavelength within that predetermined range. The layer 42 is transparent for the light 4, but reflective for the activating light 12, e.g., when impinging at small grazing angles, as shown by light beam 17. The light 12 may be in the ultra violet region of the spectrum or in the 400 to 500 nanometer wavelength region, to match the activation wavelength of the photochromic material in the layer 10. In FIG. 7, the light 4 enters window 40 from the side of the layer 42 and exits as light 6 from the side of the photochromic material layer 10. Light traveling in the opposite direction experiences similar attenuation.

Figure 8:
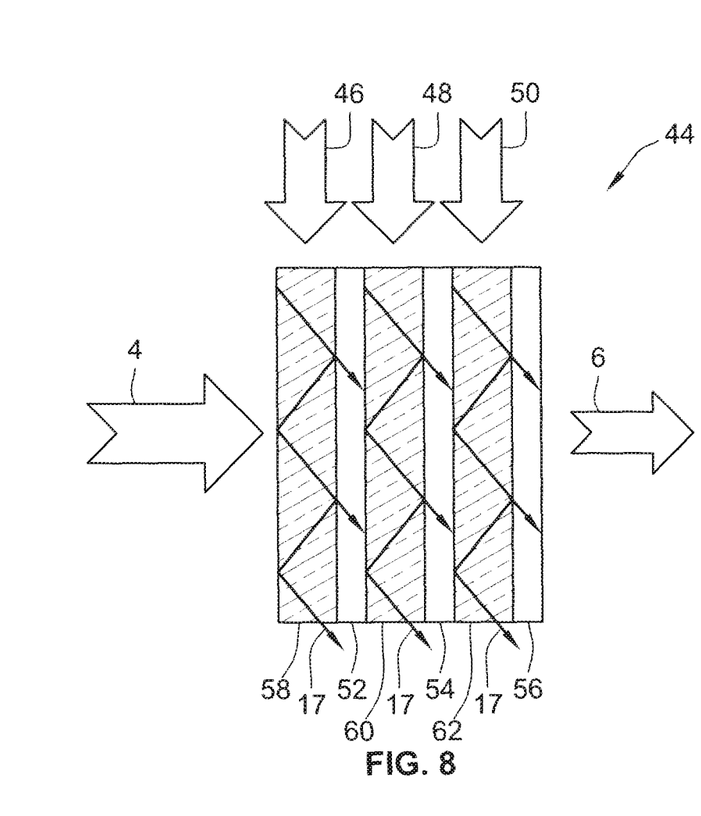
FIG. 8 is a diagram of an active transparency controlled window using multiple photochromic material layers separated by glass layers, where the glass layers serve as waveguides, enabling the filtration out of part of the spectrum, using a single or more than one activated filter.

FIG. 8 is a schematic view of an active transparency controlled window 44 using multiple photochromic material layers 52, 54 and 56 separated by layers 58, 60 and 62 of a material, e.g., glass or plastic, that is transparent to at least selected wavelengths of light. The glass layers 58, 60 and 62 serve as waveguides. The optical transparency of the window 44 is controlled by the amount of active material in the photochromic layers 52, 54 and 56 and the strength of the activating beams 46, 48 and 50, where each of the activating light beams 46, 48 and 50 controls one photochromic filter 52 or 54 or 56. In case the photochromic layers 52, 54 and 56 are absorbing, e.g., layer 52 is red-absorbing, layer 54 is green-absorbing and layer 56 is blue-absorbing. Thus, the window 44 filters out part of the spectrum, using one or more activated filters 52, 54 and/or 56. Regular, visible or infrared light 4 impinging on the window 44 is reduced in intensity while transmitted through the window 44 and exits as reduced light energy 6, where part of the impinging light 4 is absorbed in the activated layers 52, 54 and 56. The filter 44 is transparent to the light 4, but the layers 52, 54 and 56 absorb parts of the optical spectrum. The activating lights 46, 4X and 50, when impinging at small grazing angles, as shown by light beam 17, are guided by the layers 58, 60 and 62 and the activated layers 52, 54 and 56 in a controlled way. The lights 46, 48 and 50 may be in the ultra violet region of the spectrum or in the 400 to 500 nanometer wavelength region, to match the activation wavelength of the photochromic material in layers 52, 54 and 56. The transparency-controlled window 44 controls the optical spectral range and the intensity of the transmitted light 6.

Figure 9:
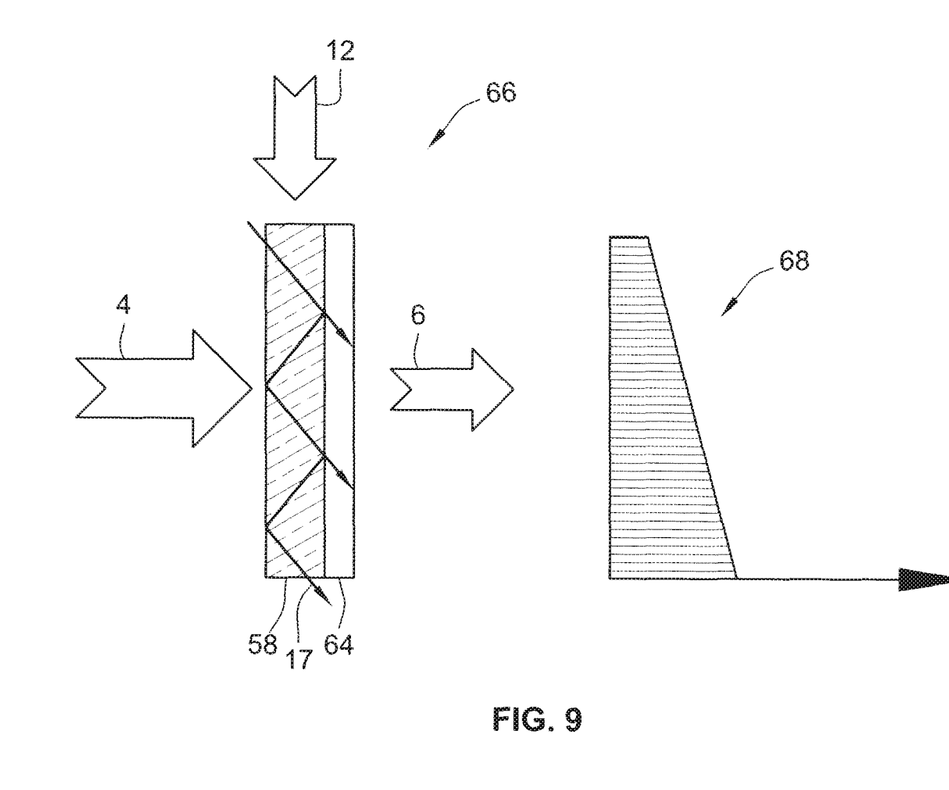
FIG. 9 is a diagram of an active transparency controlled window using a graded photochromic material layer.

FIG. 9 is a schematic view of an active transparency controlled window 66 using a graded photochromic material layer 64 and a glass or plastic layer 68 that serves as a waveguide. The optical transparency of the window 66 is controlled by the amount of active material in the photochromic layer 64 and the strength of the activating light. Light 4, impinging on the window 66 is reduced in intensity while transmitted through window 66 and exits as reduced light energy 6, where part of the impinging light 4 is absorbed in the activated layer 64. The activating light, when impinging at small grazing angles as shown by light beam 17, is guided by the glass layer 68 and the activated layer 64 in a controlled way. The activating light may be in the ultra violet region of the spectrum or in the 400 to 500 nanometer wavelength region, to match the activation wavelength of the photochromic material layer. The transparency-controlled window 66 controls the optical intensity of the transmitted light 6. The amount of activated material in the layer 64 is graded as shown in graph 68, with the amount of photochromic material increasing with the distance from said light source, to provide a substantially uniform reduction of impinging light across the window. This provides a spatially even reduction of light 4 across the active transparency controlled window 66, even when the activating light 46 impinges only from one side of the window 66.

Figure 10:
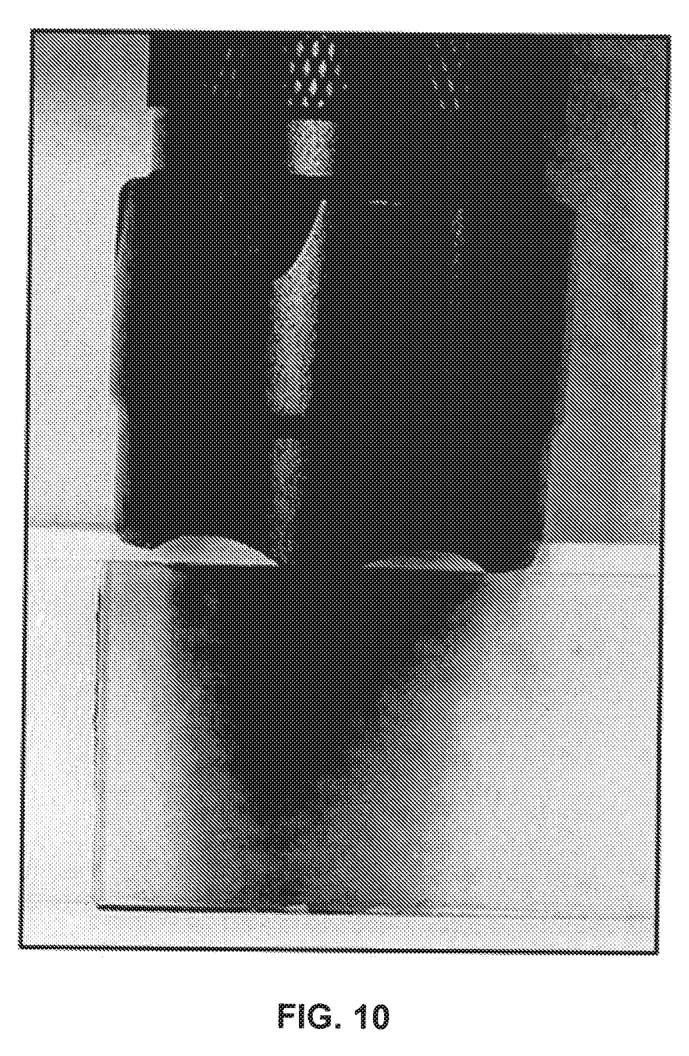
FIG. 10 is a photograph of a photochromic material layer, sandwiched between two glass layers, and partially activated by a light source located on one side (similar to FIG. 3).

FIG. 10 is a photograph of an experiment in which a window is partially activated by a light source (black flashlight) located on one narrow edge of the window (similar to FIG. 3). In this window, the photochromic material layer, composed of naphthopyrans type photochromic molecules at around 4% concentration within a plastic matrix of acrylic type, is sandwiched between two glass layers. The right half of the window sample is not activated and remains highly transparent, while the left side, which is subjected to light from the black flashlight emitting at −400 nm, shows a dramatic reduction in its transparency. A more evenly distributed illumination, e.g., by multiple light sources, will result in a uniform appearance with regard to the light transmittance of the window.

Figure 11:
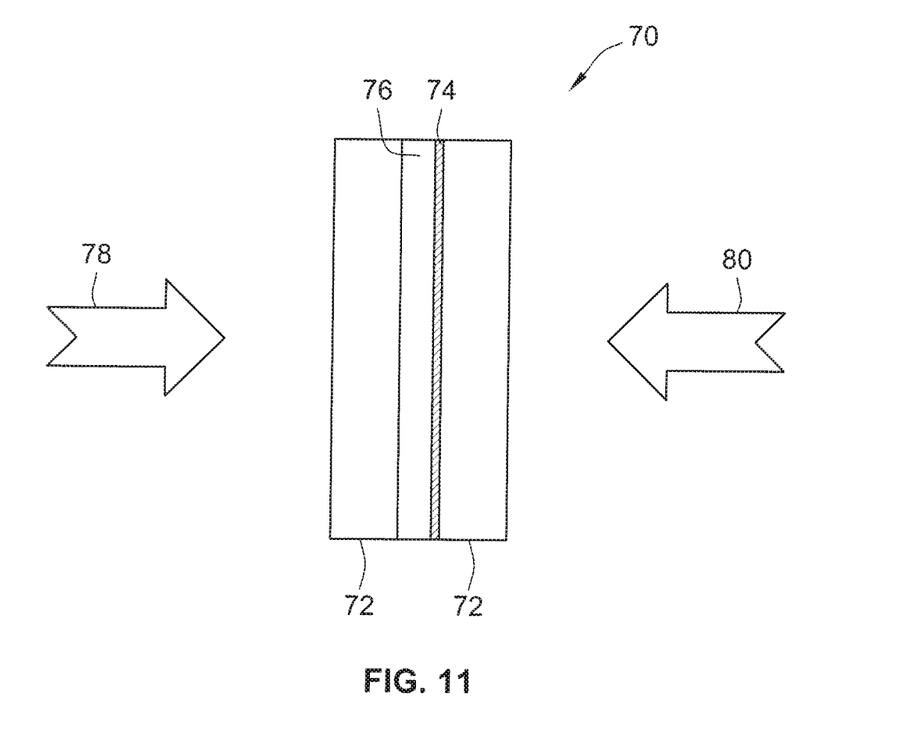
FIG. 11 is a diagram of an active transparency controlled window having a photochromic material layer and a blocker for the activating light, acting as a "light diode" that is transparent in one direction and nearly opaque in the opposite direction.

FIG. 11 is a diagram of an active transparency controlled window 70 having a photochromic material layer 76 and a layer 74 of a material that blocks the activating light. The photochromic material 76 is sandwiched between two layers 72 of glass or plastic where one glass or plastic layer is coated to provide the blocking layer 74 for the activating light. The blocking layer 74 is transparent to all other wavelengths of light. The activating light and the regular light come from the same source, e.g., solar light, in direction 78 or 80, and the response of the device depends on the direction of the incoming light. Specifically, when the activating light arrives in direction 80 and engages the blocking layer 74 before impinging on the photochromic material 76, the window will stay transparent. When the activating light arrives in direction 78 and engages the photochromic material 76 before impinging on the blocking layer 74, the window will change its transparency and transmit only a fraction of light. The photochromic material can be designed to turn substantially opaque when activating light arrives in direction 78, so that this window acts like a light diode for the impinging light 78 or 80 that contains the activating light, e.g., fully transparent for light coming from direction 80 and nearly opaque for light coming from the opposite direction 78.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims

The invention claimed is:

1. An active, transparency-controlled window comprising
   at least one layer of a material that is transparent to at least selected wavelengths of light,
   at least one layer of photochromic material formed as an integral part of the window in the path of light passing through said layer of transparent material and having a transparency, to said at least selected wavelengths of light, that can be controllably altered by an activating light, said photochromic material being applied to a glass layer that serves as a waveguide for said activating light and the amount of said photochromic material is graded with a concentration that increases with the distance from a light source, to provide a substantially uniform reduction of impinging light across the window, and
   a controllable source of light that activates said photochromic material to controllably alter the transparency of said photochromic material to said at least selected wavelengths of light, said light from said controllable source being transmitted along a path transverse to the path of light passing through said window.

2. The active, transparency-controlled window of claim 1 in which said material that is transparent to at least selected wavelengths of light is made of a material selected from the group consisting of glass and plastic.

3. The active, transparency-controlled window of claim 1 in which said controllable light source directs light into said photochromic material, and alters the transparency of said window by altering the transparency of said at least one layer of photochromic material by adjusting the strength of said light directed into said photochromic material from said controllable light source.

4. The active, transparency-controlled window of claim 1 in which said controllable light source directs light into said photochromic material through at least one edge of said window.

5. The active, transparency-controlled window of claim 1 in which said photochromic material is sandwiched between two layers of said material that is transparent to at least selected wavelengths of light.

6. The active, transparency-controlled window of claim 5 in which said two layers of said material that is transparent to at least selected wavelengths of light include dedicated coatings to provide a waveguide for said activating light, to protect an observer's eyes from said activating light.

7. The active, transparency-controlled window of claim 5 in which said two layers of said material that is transparent to at least selected wavelengths of light have indices of refraction that are (1) substantially the same as or lower than the index of refraction of said photochromic material, and (2) higher than the ambient environment of said window, to provide a waveguide for said activating light and efficient penetration of said activating light into said photochromic material.

8. The active, transparency-controlled window of claim 1 in which said photochromic material is activatable by light within a predetermined range of wavelengths, and said controllable light source produces light having a wavelength within said predetermined range.

9. The active, transparency-controlled window of claim 8 in which said predetermined range of wavelengths is in the ultraviolet region of the spectrum or in the 400 to 500 nanometer wavelength region.

10. The active, transparency-controlled window of claim 1 in which said controllable light source includes at least one light emitting diode or diode laser.

11. The active, transparency-controlled window of claim 10 in which said controllable light source includes at least one lens or lens array to provide the light source with a prescribed divergence angle.

12. The active, transparency-controlled window of claim 10 in which said controllable light source includes at least one single-optical-fiber or multiple-optical-fiber device.

13. The active, transparency-controlled window of claim 1 in which said at least one layer of photochromic material includes multiple layers of photochromic material having different colors and separated by glass layers that serve as waveguides to filter out of part of the spectrum.

14. The active, transparency-controlled window of claim 1 in which said controllable light source is controlled to produce a preselected opacity level from the combined activation of said photochromic material by (1) ambient light and (2) light from said controllable light source.

15. The active, transparency-controlled window of claim 1 in which said photochromic material is covered on one side with a layer of a material that blocks said activating light so that said photochromic material remains transparent when activating light arrives from said one side, and changes transparency when activating light arrives from the opposite side.

16. The active, transparency-controlled window of claim 15 in which said photochromic material becomes substantially opaque when activating light arrives from said opposite side.

17. The active, transparency-controlled window of claim 1 in which said photochromic material is applied to a glass layer that serves as a waveguide for said activating light and is tapered to provide substantially even illumination of said layer of photochromic material.

* * * * *